United States Patent
Banno et al.

(10) Patent No.: US 9,393,995 B2
(45) Date of Patent: Jul. 19, 2016

(54) VEHICLE STEERING DEVICE

(71) Applicant: HONDA MOTOR CO., LTD., Tokyo (JP)

(72) Inventors: Yoshifumi Banno, Wako (JP); Norifumi Tamura, Wako (JP); Yuki Endo, Wako (JP); Shoji Hamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/331,880

(22) Filed: Jul. 15, 2014

(65) Prior Publication Data

US 2015/0025744 A1    Jan. 22, 2015

(30) Foreign Application Priority Data

Jul. 16, 2013   (JP) ................................. 2013-147276

(51) Int. Cl.
    *B62D 6/04*    (2006.01)

(52) U.S. Cl.
    CPC ........................................ *B62D 6/04* (2013.01)

(58) Field of Classification Search
    CPC .... B62D 5/0457; B62D 5/046; B62D 5/0463;
        B62D 5/0466; B62D 6/00; B62D 6/002;
        B62D 6/003; B62D 6/005; B62D 6/008;
        B62D 6/04; B62D 6/10
    See application file for complete search history.

(56) References Cited

U.S. PATENT DOCUMENTS

| | | | | |
|---|---|---|---|---|
| 4,830,127 A | * | 5/1989 | Ito ............................. | B62D 6/04 180/446 |
| 2004/0148080 A1 | * | 7/2004 | Ekmark ................. | B62D 6/008 701/41 |
| 2006/0085113 A1 | * | 4/2006 | Tamaizumi .......... | B62D 5/0463 701/41 |
| 2007/0029129 A1 | * | 2/2007 | Shiozawa et al. ............. | 180/446 |
| 2008/0217099 A1 | * | 9/2008 | Reungwetwattana | B62D 5/0472 180/446 |
| 2010/0070135 A1 | * | 3/2010 | Wang et al. ...................... | 701/41 |
| 2010/0211264 A1 | * | 8/2010 | Wey et al. ........................ | 701/41 |
| 2010/0228440 A1 | * | 9/2010 | Yamazaki ........................ | 701/41 |
| 2011/0022270 A1 | * | 1/2011 | Tamaizumi et al. ............ | 701/41 |
| 2011/0029200 A1 | * | 2/2011 | Shah ................................ | 701/41 |
| 2011/0184608 A1 | * | 7/2011 | Benyo et al. .................... | 701/41 |
| 2012/0203397 A1 | * | 8/2012 | Michelis ................ | B62D 6/008 701/1 |

FOREIGN PATENT DOCUMENTS

JP       2001-1923 A    1/2001

* cited by examiner

*Primary Examiner* — Jerrah Edwards
*Assistant Examiner* — Tamara Weber
(74) *Attorney, Agent, or Firm* — Westerman, Hattori, Daniels & Adrian, LLP

(57) ABSTRACT

It is determined whether or not a vehicle is in a first vehicle state based on a detected steering torque and a detected yaw rate (step S1), one-side pull is decided if the yaw rate is within a range from 2 deg/sec to 10 deg/sec (step S4) for 1 second which is a first predetermined time (step S3) since an absolute value of the steering torque becomes 20 Nm or larger in the first vehicle state (step S2), then a target current value (one-side response) is generated.

7 Claims, 8 Drawing Sheets

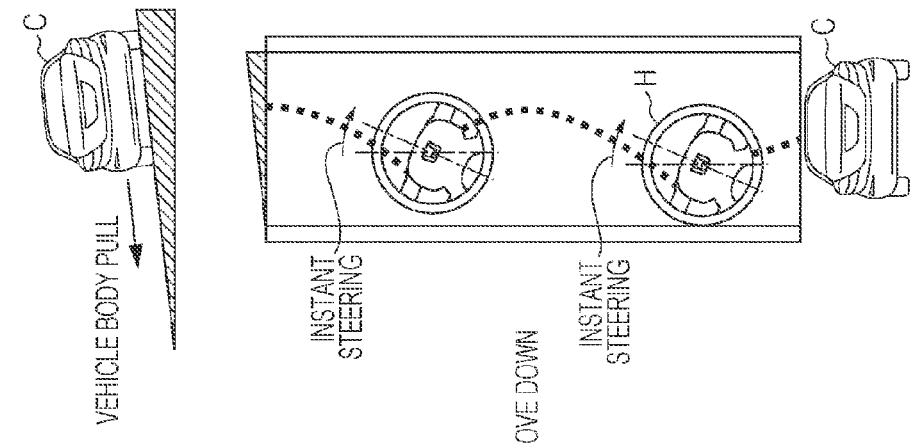
FIG. 4A  FIG. 4B  FIG. 4C
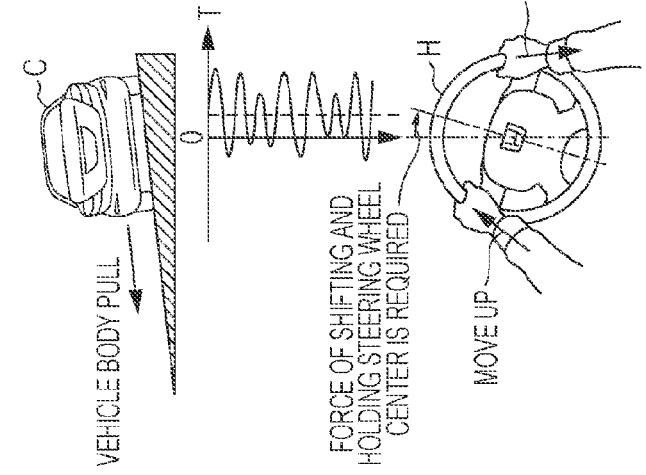
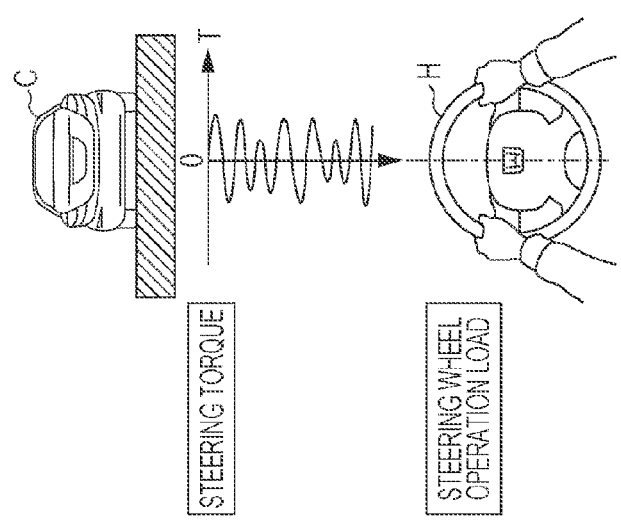

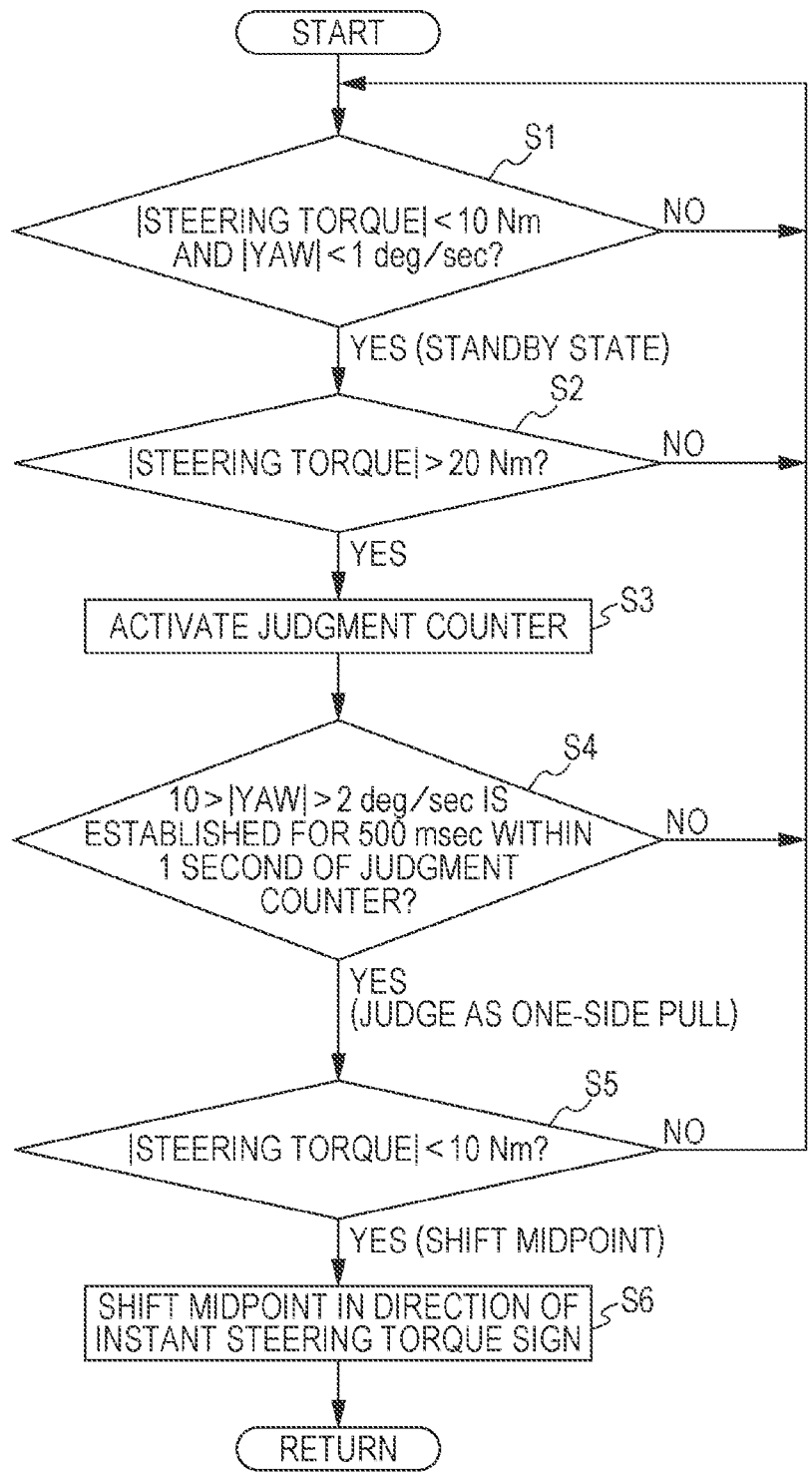

US 9,393,995 B2

VEHICLE STEERING DEVICE

CROSS REFERENCES TO RELATED APPLICATIONS

The present application claims priority under 35 U.S.C. §119 to Japanese Patent Application No. 2013-147276, filed Jul. 16, 2013, entitled "Vehicle Steering Device." The contents of this application are incorporated herein by reference in their entirety.

TECHNICAL FIELD

The present disclosure relates to a vehicle steering device including an electric motor for steering (steering assist).

BACKGROUND

When a vehicle travels on a cant road with an inclination in the width direction of the road (toward a road shoulder) or when the vehicle travels in side winds, the vehicle pulls to the lower side in the inclination direction because of the gravity on the cant road, or the vehicle pulls to the leeward in the side winds because of the wind power although the vehicle intends to travel straight ahead. That is, one-side pull of the vehicle is generated. Hence, to travel straight ahead against the one-side pull of the vehicle, a driver has to rotate a steering wheel to the upper side in the inclination direction or the windward. That is, even during the straight-ahead travel, the driver has to continuously give a steering force in a direction opposite to a direction to which the vehicle pulls (the one-side pull direction).

For example, Japanese Unexamined Patent Application Publication No. 2001-1923 discloses a vehicle steering device that, in the case that a disturbance, which affects a vehicle behavior, is generated (for example, during travel on the cant road or during travel in the side winds), can obtain a disturbance effect value D meeting the degree of effect of the disturbance with respect to the vehicle behavior, and can control a steering assist force Ta in accordance with the disturbance effect value D.

In Japanese Unexamined Patent Application Publication No. 2001-1923, a dead band is provided around the midpoint of a steering torque, and the steering assist force is generated if the steering torque exceeds the dead band, to cancel the disturbance (the inclination of the cant road or side winds).

In addition to the driving style of continuously giving the steering force in the direction opposite to the direction of the one-side pull (in the direction to the lower side of the inclination of the cant road), there is another driving style for the cant road etc. The style is steering the vehicle slightly largely for a short time against the cant road, then releasing the hands from the steering wheel, and if the vehicle body pulls again, steering the vehicle slightly largely again. These steps are repeated (hereinafter, referred to as "instant steering" in this specification). In the case of this driving style, one-side pull response control may not be properly operated with a control method of related art.

SUMMARY

Accordingly, it is desirable to provide a vehicle steering device that can properly handle such a driving style on a cant road etc.

According to one aspect of the present disclosure, there is provided a vehicle steering device (1) including a steering torque detection unit that detects a steering torque, and a vehicle behavior detection unit that detects a vehicle behavior, the vehicle steering device controlling an electric current value, which is applied to an electric motor, and applying an assist torque to a steering system based on the steering torque. The device includes a one-side pull response control unit (12) that detects one-side pull generated at a vehicle (1206), and calculates a correction current value, which corrects the current value to restrict the one-side pull. It is judged whether or not the vehicle is in a first vehicle state based on the detected steering torque and the detected vehicle behavior (a), and the correction current value is calculated, if the vehicle behavior satisfies a predetermined condition within a first predetermined time since an absolute value of the steering torque becomes a first steering torque predetermined value or larger in the first vehicle state (b), the correction current value being calculated in the same direction as a direction of the steering torque when the first steering torque predetermined value is satisfied (c). In the above, specific elements with their reference numerals are indicated by using brackets. These specific elements are presented as mere examples in order to facilitate understanding, and thus, should not be interpreted as any limitation to the accompanying claims.

With this configuration, if the state of the vehicle is the first vehicle state, the vehicle becomes a "standby state." This state may be, for example, a state in which almost no steering is provided. It is assumed that the vehicle behavior (for example, yaw rate) satisfies the predetermined condition in the first vehicle state (standby state), within the first predetermined time period counted since the absolute value of the steering torque becomes the first steering torque predetermined value or larger (at this time, instant steering is performed) (for example, one-side pull is generated under this predetermined condition). If the vehicle behavior satisfies the predetermined condition, the correction current value is calculated in the same direction as the direction of the steering torque when the steering torque satisfies the first steering torque predetermined value (that is, when instant steering is performed).

Also, according to another aspect of the present disclosure, in a vehicle steering device (2), the first vehicle state may satisfy that the absolute value of the steering torque is smaller than a second steering torque predetermined value, which is smaller than the first steering torque predetermined value, and that an absolute value of the vehicle behavior is smaller than a first vehicle behavior amount predetermined value.

With this configuration, in an embodiment (described later), the first vehicle state satisfies that the absolute value of the steering toque <10 Nm and the absolute value of the yaw rate <1 degrees per second (hereinafter, expressed by deg/sec). These values may also represent that almost no steering is provided.

In the embodiment (described later), the first steering torque predetermined value is 20 Nm or larger because of the instant steering, and the second steering torque predetermined value is smaller than 10 Nm because of the one-side pull. Also, the first vehicle behavior amount predetermined value is 1 deg/sec.

Further, according to still another aspect of the present disclosure, in a vehicle steering device (3), the predetermined condition of the vehicle behavior may satisfy that a time, in which an absolute value of the vehicle behavior is in a range from a second vehicle behavior amount predetermined value to a third vehicle behavior amount predetermined value, is a second predetermined time or longer.

With this configuration, in an embodiment (described later), the second vehicle behavior amount predetermined value is 2 deg/sec, and the third vehicle behavior amount predetermined value is 10 deg/sec. The predetermined condition is in a range from 2 to 10 deg/sec. If such a small yaw rate is detected for 500 milliseconds (hereinafter, expressed as msec) (second predetermined time) or longer after the instant steering, the detection indicates generation of one-side pull.

Further, according to yet another aspect of the present disclosure, there is provided a vehicle steering device (4) that judges whether or not pulse-like steering is detected a plurality of times in the same direction and at a predetermined interval from a detection value of a steering torque sensor and/or a detection value of a steering angle sensor, and if the pulse-like steering is detected, generates correction current for driving an electric motor for steering in the same direction as the direction of the detected pulse-like steering.

Since the pulse-like steering may be repeated on the cant road, one-side pull response control is executed by detecting this repetition of the pulse-like steering. Comparing the pulse-like steering and others during the interval, the steering torque and the steering angle in the predetermined interval between the respective pulse-like steering operations is smaller than those in the pulse-like steering operation, and may be considered that almost no steering is provided.

With the present disclosure, the vehicle steering device that can properly handle such a driving style on the cant road is provided.

BRIEF DESCRIPTION OF THE DRAWINGS

The advantages of the disclosure will become apparent in the following description taken in conjunction with the following drawings.

FIGS. 4A to 4C each illustrate an inclination of a vehicle body, a steering torque, etc., when the driver drives the vehicle C and travels on a road. FIG. 4A shows a case of a flat road. FIG. 4B shows a case without one-side pull response control on a cant road (a case before the one-side pull response control is started). FIG. 4C shows a case with the one-side pull response control on a cant road (a case after the one-side pull response control is started).

FIG. 5 is a flowchart for detecting a driving style of instant steering and starting one-side pull response control.

DETAILED DESCRIPTION

Embodiments (implemental embodiments) for implementing the present disclosure are described below in detail with reference to the accompanying drawings.

In the following description, a "first vehicle state (standby state)" satisfies an absolute value of a steering torque <10 Nm (second steering torque predetermined value), and an absolute value of a yaw rate <1 deg/sec (first vehicle behavior amount predetermined value). That is, the state is considered that almost no steering is provided by a driver.

Also, in the following embodiments, a "first steering torque predetermined value" is a steering torque having an absolute value of 20 Nm or larger, a "first predetermined time" is 1 second, and a "second predetermined time" is 500 msec. Further, a "predetermined condition" is a yaw rate being in a range from 2 deg/sec (second vehicle behavior amount predetermined value) to 10 degrees/second (third vehicle behavior amount predetermined value). It is to be noted that these values are merely examples.

First Embodiment

General Configuration

Figure 1:
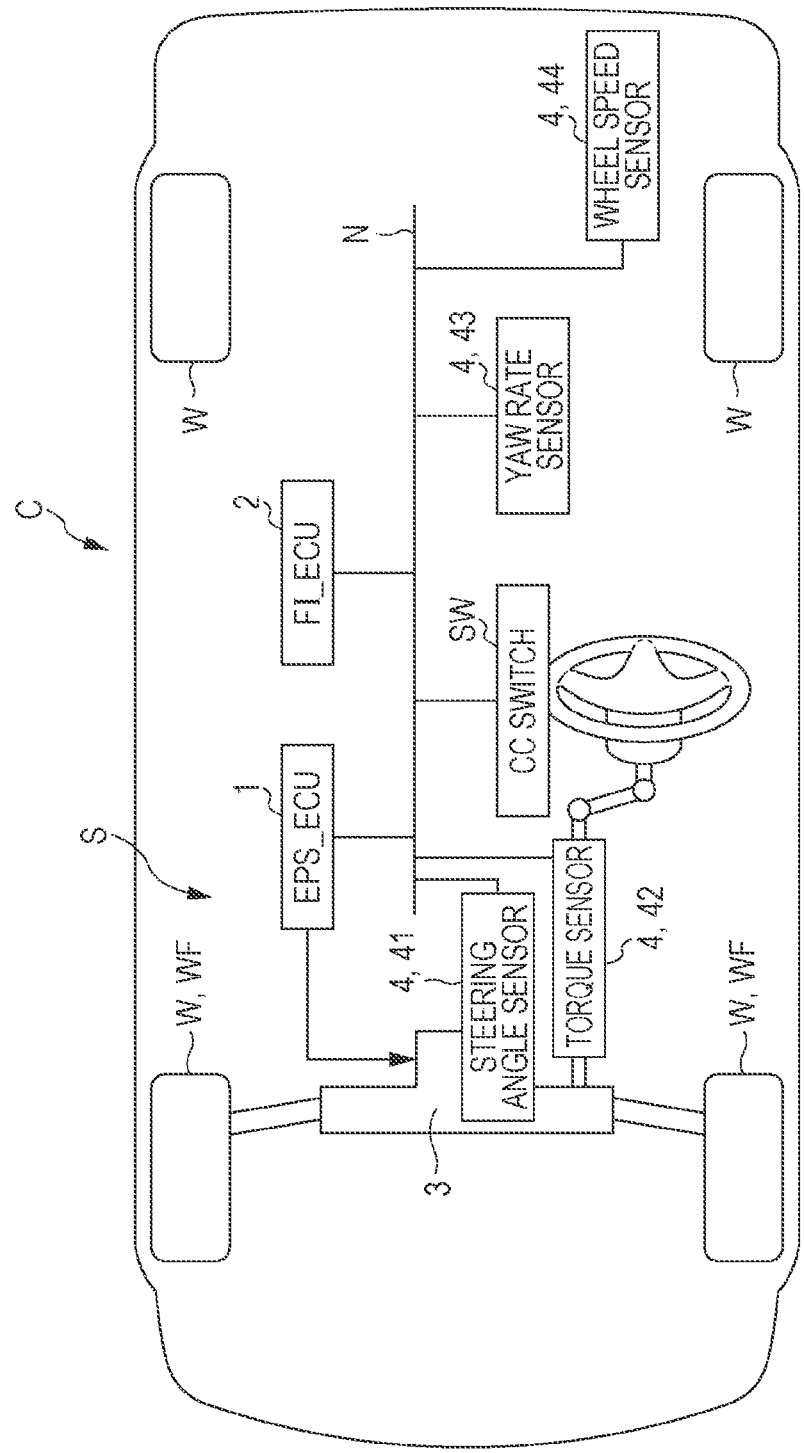
FIG. 1 schematically illustrates a general configuration of a vehicle on which a vehicle steering device according to a first embodiment of the disclosure is mounted.

FIG. 1 schematically illustrates a general configuration of a vehicle C on which a vehicle steering device S according to an embodiment of the present disclosure is mounted. As shown in FIG. 1, the vehicle C is a four-wheel vehicle including four wheels W (reference sign WF denotes a wheel for steering). The vehicle C includes a configuration of an electric power steering device having an EPS_ECU 1 and a steering motor 3 as principal portions of the vehicle steering device S. The electric power steering device is a known device that may decrease a required steering force of a driver to be input from a steering wheel H, by actuating the motor 3. Hence, the detailed description of the electric power steering device is omitted. Also, the vehicle C includes an FI_ECU 2. The FI_ECU 2 is also a known technology, and hence the detailed description thereof is omitted. EPS is an abbreviation for electric power steering.

Also, FI is an abbreviation for fuel injection. ECU is an abbreviation for electronic control unit.

In FIG. 1, reference sign 41 denotes a steering angle sensor (steering angle detection unit), and in this embodiment, an angle sensor that measures an angle of the motor 3 is used as a substitute for the steering angle sensor. The steering angle sensor 41 also detects a rotation speed (motor rotation speed (=steering speed)) of the motor 3 in addition to the steering angle. Reference sign 42 denotes a steering torque sensor (steering torque detection unit, in FIG. 1, written as "torque sensor") that detects a steering torque (manual steering force) input from the driver through the steering wheel H. Reference sign 43 denotes a yaw rate sensor that detects a yaw rate (turn angle) of the vehicle C. Reference sign 44 denotes a wheel speed sensor that detects a rotation speed (wheel speed pulse) of the wheel W. FIG. 1 illustrates the wheel speed sensor only for the single wheel W; however, the wheel speed sensor is actually provided for each of the four wheels W. The vehicle speed may be an average value of detection values of the wheel speed sensors 44 provided at the four wheels W, or an average value of detection values of the wheel speed sensors 44 provided at the wheels W serving as driven wheels.

The respective sensors including the steering angle sensor 41 to the wheel speed sensors 44 may be collectively called sensor(s) 4.

In FIG. 1, reference sign SW denotes a cruise control switch (in FIG. 1, written as "CC switch"). The cruise control switch SW is arranged at the steering wheel H or near the steering wheel H, and is turned ON by the driver when the vehicle travels on a highway or the like under cruise control.

In the following description, it is assumed that the cruise control switch SW is arranged at the steering wheel H.

The cruise control switch SW is automatically deactivated (turned OFF) under a predetermined condition, such as when a brake pedal is depressed, in addition to a situation in which the driver turns OFF the cruise control switch SW.

In FIG. 1, the EPS_ECU 1, the FI_ECU 2, the respective sensors 4, the cruise control switch SW, etc., are connected with each other through a communication line N such as a control area network (CAN).

Figure 2:
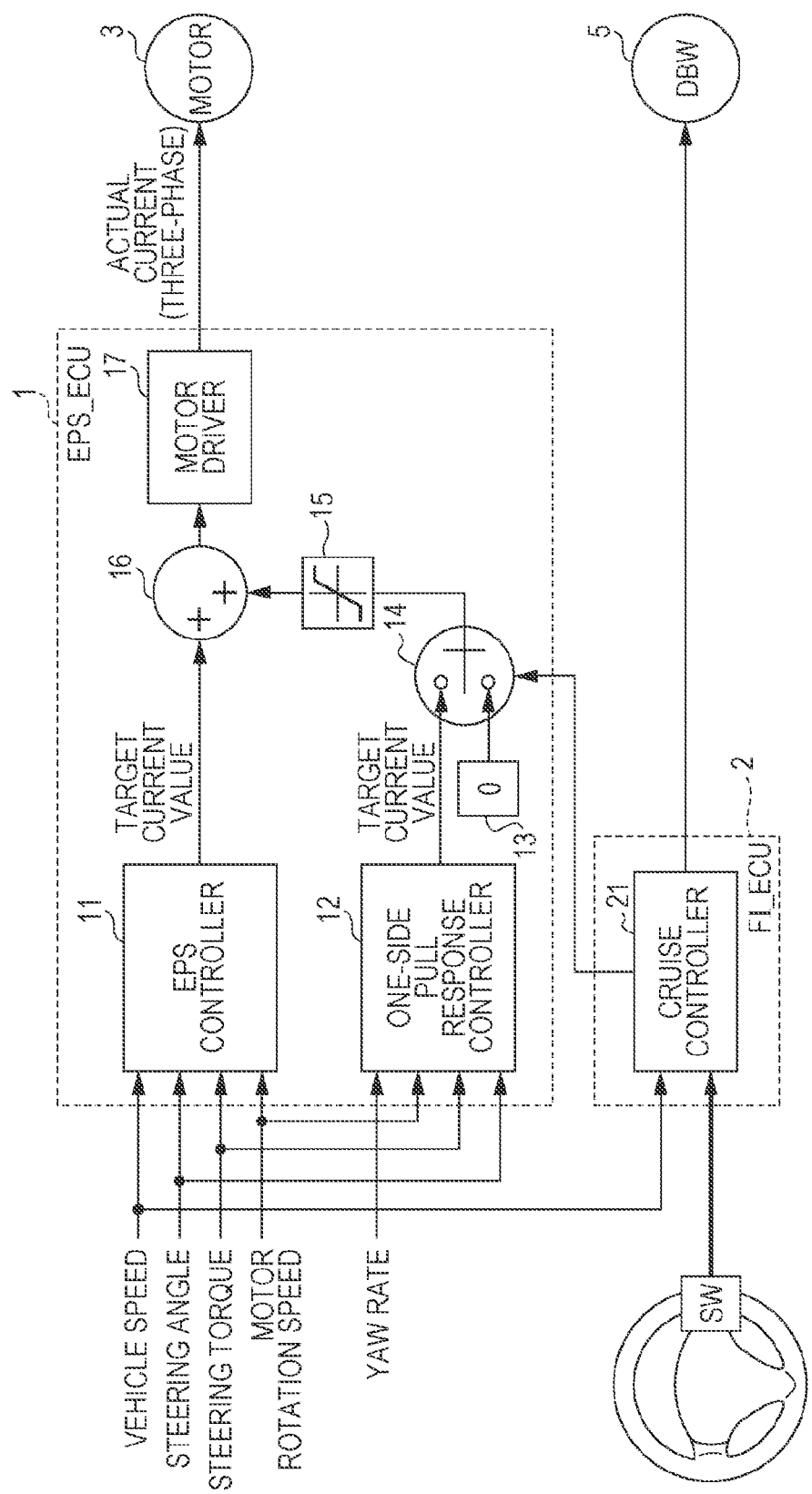
FIG. 2 is a block diagram showing brief configurations of an EPS_ECU and an FI_ECU in the vehicle in FIG. 1, and association between the EPS_ECU and the FI_ECU.

FIG. 2 is a block diagram showing brief configurations of the EPS_ECU 1 and the FI_ECU 2 in the vehicle in FIG. 1, and association between the EPS_ECU 1 and the FI_ECU 2.

[EPS_ECU]

As shown in FIG. 2, the EPS_ECU 1 is a driving control unit that includes an EPS controller 11, a one-side pull response controller (one-side pull response control unit) 12, a zero current value output unit 13, a switch 14, a limiter 15, an adder 16, and a motor driver 17, and that controls drive of the motor 3 for EPS. In the EPS_ECU 1, the one-side pull response controller 12, the zero current value output unit 13, the switch 14, the limiter 15, and the adder 16 are characteristic parts of this embodiment. The EPS controller 11 and the motor driver 17 are known configurations, and hence the specific description for the known configurations is omitted. The EPS controller 11, the one-side pull response controller 12, the zero current value output unit 13, the switch 14, the limiter 15, the adder 16, and the motor driver 17 may be respectively implemented by a circuit, or by a computer or processor which executes a program.

Although the detail is described later with reference to FIG. 3, the one-side pull response controller 12 is a function part having a function of outputting a target current value (one-side pull response) for canceling one-side pull, for example, in a situation, in which the one-side pull is generated on a cant road, to the downstream switch 14. The one-side pull response controller 12 provides "one-side pull response control."

The target current value (one-side pull response) corresponds to "correction current value." Also, the target current value (one-side pull response) corresponds to a correction current portion among actual current which is supplied to the electric motor 3.

The zero current value output unit 13 is a function part having a function of outputting a current value (0), which is supplied to the adder 16, to the downstream switch 14.

The switch 14 is a function part having a function of outputting the target current value (one-side pull response) from the one-side pull response controller 12 to the downstream limiter 15 when the cruise control switch SW is ON, or outputting the zero current value from the zero current value output unit 13 to the downstream limiter 15 when the cruise control switch SW is OFF, in accordance with a signal (cruise control execution flag (CC execution flag)) from a cruise controller 21.

The limiter 15 is a function part having a configuration that provides limitation if the absolute value of the current value output from the switch 14 exceeds, for example, a predetermined limit value. For example, when the cruise control switch SW is ON, if the absolute value of the target current value (one-side pull response) output from the one-side pull response controller 12 exceeds the predetermined limit value, the limiter 15 prevents the absolute value from exceeding the limit value.

The adder 16 adds the current value (one-side pull response) output from the limiter 15 to the target current value output from the EPS controller 11. The adder 16 is a function part having a function of adding the target current value (one-side pull response) output from the one-side pull response controller 12 to the target current value output from the EPS controller 11, and outputting the added value to the motor driver 17, when the cruise control switch SW is ON.

The motor driver 17 includes an arithmetic unit, an inverter, etc. The motor driver 17 is a function part having a function of generating a pulse width modulation (PWM) signal in accordance with the target current value after the addition processing output from the adder 16, driving the inverter with the PWM signal and generating three-phase alternating current, and driving the motor 3 with the PWM.

[FI_ECU]

The FI_ECU 2 shown in FIG. 2 is also called engine ECU that controls, for example, an ignition timing and a fuel injection amount. The FI_ECU 2 of the vehicle C in this embodiment includes the cruise controller 21. The cruise controller 21 outputs the signal (CC execution flag) to the switch 14 when the cruise control switch SW arranged at the steering wheel H is ON, so as to cause the target current value (one-side pull response) output from the one-side pull response controller 12 to be output to the downstream limiter 15.

Also, when the cruise control switch SW is turned ON, the cruise controller 21 controls the output of an engine (driving motor) through a drive by wire (DBW) valve 5, and hence causes the vehicle C to travel at a constant vehicle speed. With use of this function, for example, the driver can drive the vehicle C on a long straight road without a traffic signal or the like, at a constant vehicle speed without control of an accelerator with a foot (even when the driver releases the foot from an accelerator pedal).

Regarding association between the cruise controller 21 and the switch 14, if the cruise control switch SW is ON, one-side pull response control is more likely executed. Based on this assumption, the switch 14 is switched to the one-side pull response controller 12 to enable the one-side pull response control. Also, if the cruise control switch SW is ON, large steering is not performed, and the one-side pull response control less likely disturb comfortableness of the driver. Based on this assumption, the switch 14 is switched to the one-side pull response controller 12 to enable the one-side pull response control.

[One-Side Pull Response Controller]

Figure 3:
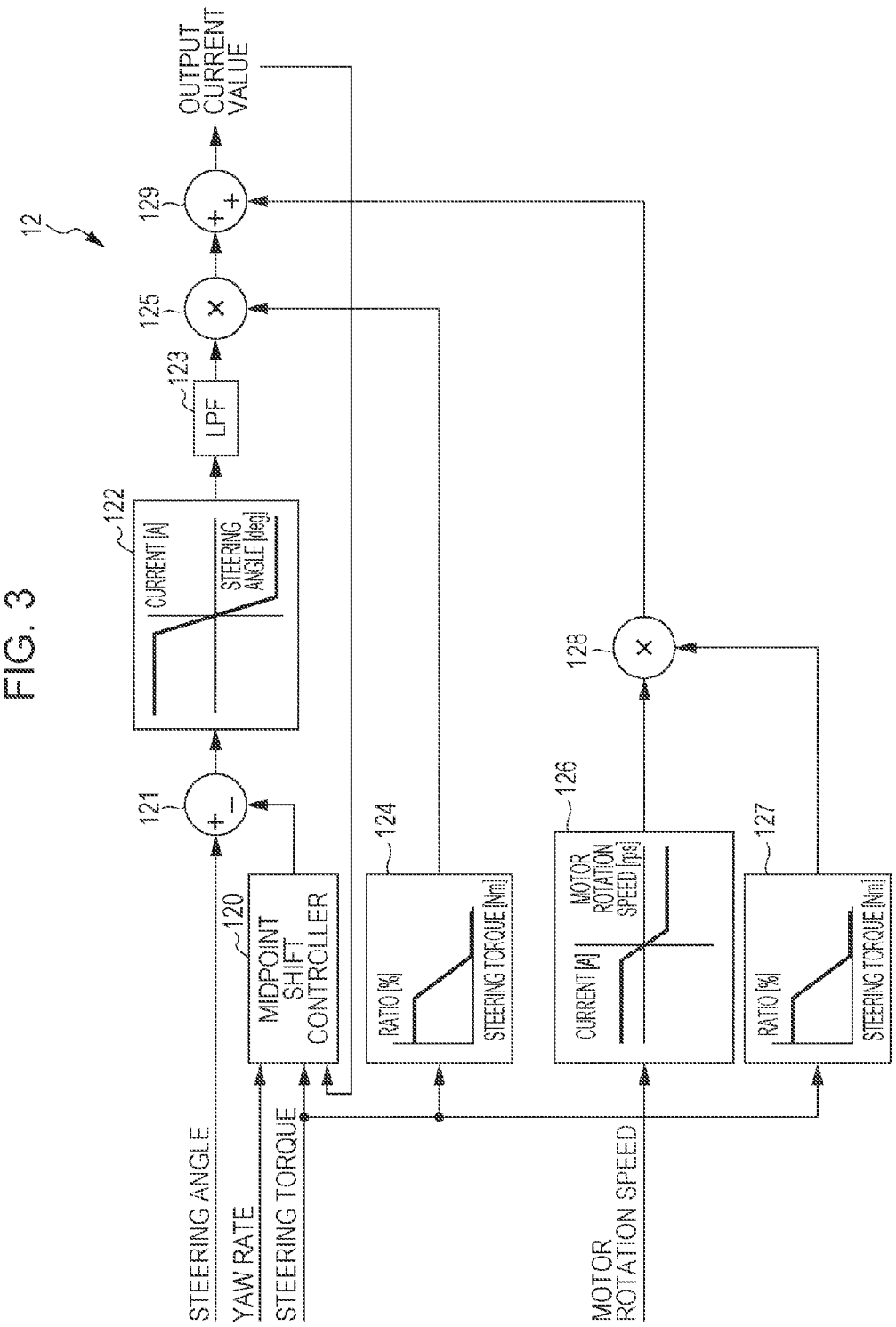
FIG. 3 is a block diagram showing an internal configuration of a one-side pull response controller in FIG. 2.

Next, the detail of the one-side pull response controller 12 is described mainly with reference to FIG. 3, which is a block diagram showing an internal structure thereof.

As shown in FIG. 3, the one-side pull response controller 12 includes a midpoint shift controller 120, a subtracter 121, a current value setting unit 122, a low-pass filter (LPF) 123, a first ratio output unit 124, a multiplier 125, a damper current value setting unit 126, a second ratio output unit 127, a multiplier 128, an adder 129, and other unit.

The one-side pull response controller 12 in this embodiment is a function part having a function of outputting a target current value (one-side pull response) that restricts the motion of the motor 3 against the force of generating the one-side pull on the vehicle C, for example, on a cant road or in side winds.

The midpoint shift controller 120 receives inputs of the yaw rate and the steering torque. The midpoint shift controller 120 judges one-side pull with reference to a flowchart in FIG. 5 (described later), and outputs a one-side pull response steering angle value. The midpoint shift controller 120 is described later in detail.

In this embodiment, the initial value of the one-side pull response steering angle value is set at 0 deg, or a current steering angle of the steering wheel H. In the one-side pull response control, the one-side pull response steering angle value is changed from the initial value (actual steering angle when the one-side pull response control is started, or 0 deg) to a value corresponding to the one-side pull, and the changed value is output as an output of the midpoint shift controller 120 to the subtracter 121.

The subtracter 121 is a function part having a function of subtracting the one-side pull response steering angle value output from the midpoint shift controller 120 with reference to the initial value of 0 deg or the current steering angle input from the steering angle sensor 41.

The current value setting unit 122 is a function part having a function of receiving an input of the value output from the subtracter 121, and converting the input one-side pull response steering angle value into a current value (base current value) based on information of correspondence between the one-side pull response steering angle value and the current value. The information of the correspondence herein is set so that the absolute value of the base current value is increased as the absolute value of the steering angle is increased. This is because the driver holds the steering at a larger steering angle as the tendency of one-side pull is increased (in the driving style of instant steering, the vehicle is frequently steered or largely and instantly steered).

To be more specific, the information of the correspondence is set so that current, which restricts the motion of the motor 3, is supplied to the motor 3 against the force, which causes the vehicle C to pull to one side, for example, on a cant road. If the motion of the motor 3 is restricted, the motion of the steering wheel H is restricted. Consequently, the load of the driver for holding the steering with the steering wheel H is decreased.

The graph in the frame of the current value setting unit 122 in FIG. 3 shows the steering angle which is plus (+) from the center to the right of the graph and minus (−) from the center to the left of the graph. For example, in the case of a steering angle to the right, the current value is set at a value of minus (−).

Regarding the correspondence in the current value setting unit 122, the current is increased or decreased across the border of the aforementioned initial value of the one-side pull response steering angle value. This is because center feel is provided by increasing or decreasing the current with respect to the initial value (herein, 0 deg) of the one-side pull response steering angle value.

Although the description is omitted, the EPS controller 11 also has a base current value and a damper current value. However, the base current value and a damper current value (described later) in the one-side pull response controller 12 are for the one-side pull response control (steering hold assist), and are basically different from those in the EPS controller 11.

The low-pass filter 123 is a function part having a function of leveling the base current value, for example, by obtaining a shift average of base current values output from the current value setting unit 122. Alternatively, by tuning the current value setting unit 122, the low-pass filter 123 may be omitted.

The first ratio output unit 124 is a function part having a function of receiving an input of the steering torque output from the steering torque sensor 42, and converting the input steering torque into a first ratio based on information of correspondence between the steering torque and the first ratio. The information of the correspondence herein is substantially set so that the value of the first ratio is decreased as the value of the steering torque is increased, for example, to allow the vehicle to easily change the lane.

The multiplier 125 is a function part having a function of multiplying the base current value output from the low-pass filter 123 by the first ratio output from the first ratio output unit 124 and hence correcting the base current value.

The damper current value setting unit 126 is a function part having a function of receiving an input of the motor rotation speed, that is, in this embodiment, a time differential value of the steering angle, and converting the input motor rotation speed into a current value (damper current value) based on information of correspondence between the motor rotation speed and the current. The information of the correspondence herein sets the damper current value so that, if the motor rotation speed is increased, the current is supplied to the motor 3 to restrict the motion.

The damper current value setting unit 126 is different from a known configuration for damper control in the EPS controller 11. The damper control in the EPS controller 11 is to give the driver stable steering feel by preventing the steering wheel H from being flattered while the vehicle C travels at a high speed. However, the damper current value in this damper current value setting unit 126 is to resist the one-side pull.

Similarly to the current value setting unit 122, the graph in the frame shows the motor rotation speed which is plus (+) from the center to the right of the graph and minus (−) from the center to the left of the graph. For example, in the case of a rotation to the right as a value of plus (+), the damper current value is set at a value of minus (−).

The second ratio output unit 127 is a function part having a function of receiving an input of the steering torque output from the steering torque sensor 42, and converting the input steering torque into a second ratio based on information of correspondence between the steering torque and the second ratio. The information of the correspondence herein is substantially set so that the value of the second ratio is decreased as the value of the steering torque is increased, similarly to the first ratio, for example, to allow the vehicle to easily change the lane, similarly to the first ratio.

The multiplier 128 is a function part having a function of multiplying the damper current value output from the damper current value setting unit 126 by the second ratio output from the second ratio output unit 127 and hence correcting the damper current value. The correction herein with the second ratio is, for example, to allow the vehicle to easily change the lane as described above.

The adder 129 adds the current value (base current value) output from the multiplier 125 and the current value (damper current value) output from the multiplier 128 together, and outputs the added value as a target current value (one-side pull response). In this embodiment, as shown in FIG. 2, the target current value (one-side pull response) is added to the target current value (target current value in EPS control) output from the EPS controller 11 at the adder 16 if the cruise control is ON. Then, the motor 3 is driven based on actual current, which is supplied from a battery (not shown) in accordance with the target current value after the addition.

[Operation 1]

Hereinbefore, the description is given from the general configuration of the vehicle C to the specific configurations of the respective units. Next, specific operations are described.

FIGS. 4A to 4C each illustrate an inclination of a vehicle body, a steering torque, a steering wheel operation load of a driver, etc., when the driver drives the vehicle C and travels on a road. FIG. 4A shows a case of a flat road. FIG. 4B shows a general driving style on a cant road. FIG. 4C shows a driving style of instant steering on a cant road.

Flat Road

As shown in FIG. 4A, in the case of straight-ahead travel (straight line) on a flat road, the vehicle body of the vehicle C is in a horizontal posture, the steering wheel H is arranged at substantially the center, and the steering torque is oscillated around zero substantially left-right symmetrically and periodically (slight steering). In this state, the muscles of the arms of the driver (biceps muscle, triceps muscle, etc.) are slightly expanded and contracted when slight steering is repeated.

The flat road herein represents a road without a noticeable inclination toward a road shoulder (that is, a road not being a cant road). The flat road may have vertical undulations (differences in height) present in the travel direction of the road.

[Cant Road (General Driving Style)]

As shown in FIG. 4B, on a cant road with an inclination toward a road shoulder, vehicle body pull (one-side pull of the vehicle C) is generated because of the gravity. As shown in FIG. 4B, on a cant road with an inclination to the lower side toward a left road shoulder, one-side pull (vehicle body pull) to the left is generated. Hence, the driver inclines the steering wheel H to the right and holds the steering.

If an electric power steering (EPS) device such as the vehicle steering device S in this embodiment is provided, the EPS (EPS controller 11) sets a target current value corresponding to a steering torque etc. in accordance with the steering torque, and causes the motor 3 to generate a steering assist force for assisting the steering force of the driver. However, since the EPS is formed with regard to steering at an intersection, a curve road, a parking space, etc., the EPS may not correspond to one-side pull response on a cant road, that is, a case in which a not-so-large steering torque in one direction is continued for a long time. That is, in the case of a not-so-large steering torque, the steering assist force is almost not generated by the motor because of the dead band of the steering torque. For example, in the United States, there is a place in which a cant road continuously extends by a long distance to improve drainage of the road. In such a place, a large load is given to the driver with the normal EPS, and comfortableness may be decreased.

There is known a vehicle steering device available for one-side pull response control to assist such a general driving style on a cant road. However, even such control may not handle a driving style like instant steering. That is, in Japanese Unexamined Patent Application Publication No. 2001-1923, which is described above, the case of normal travel at a constant steering angle is expected (see Paragraph 0017 etc. of Japanese Unexamined Patent Application Publication No. 2001-1923). The case of a driving style such as instant steering may not be considered as the normal travel state at a constant steering angle, and may not be recognized as travel on a cant road. There is also known Japanese Unexamined Patent Application Publication No. 2007-62712, the entire contents of which are incorporated herein by reference, as another document corresponding to one-side pull although the one-side pull in this case is caused by a vehicle. However, this is based on a steering history during straight-ahead travel, and hence does not correspond to the driving style of instant steering.

Cant Road (Driving Style of Instant Steering)

As shown in FIG. 4C, there is the driving style of instant steering as a driving style different from the case in which steering is held at a constant steering angle even on the same cant road. In this driving style, when the vehicle C pulls toward a road shoulder, the handle H is slightly rotated (instant steering) to change the travel direction of the vehicle C, then the hand is released immediately (the force of gripping the steering wheel H is relaxed), and if the vehicle C pulls toward the road shoulder again, the steering wheel H is instantly rotated again. In this driving style, pulse-like steering (pulse-like steering torque or steering angle) is detected a plurality of times in the same direction and at a predetermined interval. The predetermined interval at which the pulse-like steering (steering torque or steering angle) is detected tends to decrease as the vehicle speed increases. Also, the predetermined interval tends to decrease as the force of vehicle body pull (one-side pull) increases (that is, as the inclination of the cant road increases). Also, the instant steering is steering for a very short period as literally expressed. The predetermined interval is markedly longer than the pulse width of the steering (steering torque or steering angle) by the instant steering.

Although the detail will be described later, in this embodiment, the midpoint shift controller 120 of the one-side pull response controller 12 shown in FIG. 3 judges whether or not the driving style is the instant steering corresponding to the one-side pull with reference to the steering torque and the yaw rate, and shifts the midpoint of the steering angle. As shown in FIG. 3, the EPS_ECU 1 adds the output current value (target current value (one-side pull response)) based on the shifted midpoint output from the one-side pull response controller 12 to the target current value output from the EPS controller 11 (the adder 16), and generates actual current to be supplied to the motor 3 (motor driver 17).

Although the detail is described later, with the one-side pull response control, even in the situation in which the one-side pull (vehicle body pull) is generated, the load of the driver for steering is markedly decreased, and the steering load at the level of a flat road can be achieved.

[Operation 2]

Next, with reference to FIGS. 4A to 4C, a period from when the vehicle C of this embodiment enters the cant road from the flat road to when the one-side pull response control is started, is described in time series (with reference to FIGS. 2 and 3 if required).

[Flat Road]

On the flat road shown in FIG. 4A, it is assumed that the driver turns ON the cruise control switch SW arranged at the steering wheel H. Then, under the control of the FI ECU 2, the DBW valve 5 is controlled, to provide travel at a constant speed. Accordingly, the driver saves an effort of operating an accelerator pedal for the travel at the constant speed. Further, since the cruise control switch SW is turned ON, in the FI_ECU 2, the cruise controller 21 outputs a signal indicative of that the cruise control switch SW is turned ON, to the switch 14. The switch 14 is switched in response to the signal serving as a trigger, and causes the target current value output from the one-side pull response controller 12 to pass to the downstream limiter 15. Also, the switch 14 shuts off the zero current value output from the zero current value output unit 13.

Since the cruise control switch SW is turned ON, the target current value (one-side pull response) output from the one-side pull response controller 12 is apparently added to the target current value output from the EPS controller 11 at the adder 16.

However, as shown in FIG. 4A, the value of the steering torque is left-right symmetric (equivalent) about zero. Since the steering is steering on a straight road, the range of the detected steering torque is in the range of the dead band for the steering torque of the EPS controller 11, and hence the motor 3 is not actuated yet.

That is, in the slight steering on the flat road, the initial value of the one-side pull response steering angle value is output from the midpoint shift controller 120. Hence (see FIG. 3), the current value setting unit 122 executes control by using the steering angle, which does not cause the midpoint to be shifted. Further, in the case of the straight-ahead travel on the flat road as described above, any of the steering torque, the steering angle, and the motor rotation speed (steering speed)

is small (the motor 3 is to be rotated by an external force even if rotated). Hence, the target current value (one-side pull response) output from the one-side pull response controller 12 is zero or a value close to zero.

Even if the target current value (one-side pull response) output from the one-side pull response controller 12 is added to the target current value output from the EPS controller 11 because the driver turns ON the cruise control switch SW, the target current value (one-side pull response) is zero or a value close to zero on the flat road as described above. Accordingly, electric power consumed by the motor 3 is not increased.

As it is understood with reference to FIGS. 3 to 4C, in the vehicle C of this embodiment, the respective functions of the one-side pull response controller 12 are constantly activated and the target current value (one-side pull response) is output. Regarding this point, the respective functions of the one-side pull response controller 12 in rest may be operated in response to that the cruise control switch SW is turned ON as a trigger.

[Cant Road (Instant Steering)]

Next, it is assumed that the vehicle C enters the cant road shown in FIG. 4C from the flat road. It is assumed that the cruise control switch SW is already turned ON on the flat road.

The driver performs the driving style of the instant steering for the one-side pull.

Herein, in one-side pull response control of related art such as Japanese Unexamined Patent Application Publication No. 2001-1923, one-side pull is judged based on the normal travel state with the constant steering angle as described above. Therefore, with the driving style of the instant steering, even if one-side pull is generated at the vehicle C, the one-side pull cannot be detected. Owing to this, control for the one-side pull cannot be executed.

However, as shown in FIG. 4C, by performing pulse-like steering for a very short period, the midpoint shift controller 120 detects that the vehicle C travels on a cant road. Accordingly, the one-side pull response control is started. This point is described with reference to FIG. 5, which is a flowchart for detecting the driving style of the instant steering and starting the one-side pull response control.

The main operation part of this flowchart is the midpoint shift controller 120.

In step S1, it is judged whether conditions are satisfied or not, the conditions including that the absolute value of the steering torque detected by the steering torque sensor 42 is smaller than 10 Nm (second steering torque predetermined value) and the absolute value of the yaw rate detected by the yaw rate sensor 43 is smaller than 1 deg/sec (first vehicle behavior amount predetermined value). That is, it is judged whether or not the vehicle C is in the first vehicle state (standby state). The standby state is a state in which the driver provides almost no steering.

If the conditions are satisfied (YES in S1), the state is judged as the standby state, and the processing goes to next step S2. In contrast, if the conditions are not satisfied (NO in S1), the processing returns to step S1 (or the processing may go out of this routine).

If travel in the standby state is made on a cant road, one-side pull is generated. Hence, the driver instantly steers (rotates) the steering wheel H.

In step S2, it is judged whether or not the absolute value of the detected steering torque exceeds 20 Nm (first steering torque predetermined value) (whether the first steering torque predetermined value is satisfied or not). The first steering torque predetermined value is a threshold for judging whether or not the instant steering is performed. The first steering torque predetermined value may vary depending on the vehicle type, road surface friction, vehicle speed, tire type, and inclination of the cant road, and hence the numerical value is merely an example. The steering torque which is detected at the instant steering may be typically a smaller value than a value caused by a turn, rapid lane change, or an obstacle avoidance behavior.

If the steering torque exceeds the first steering torque predetermined value (satisfies the first steering torque predetermined value) (YES in S2), instant steering may be possibly made by the driver. The processing goes to next step S3. In contrast, if the steering torque does not exceed the first steering torque predetermined value (NO in S2), instant steering is less possibly made. The processing returns to step S1 (or the processing may go out of this routine).

In step S3, a judgment counter for judging whether the driving style is instant steering or not is activated. Then, in next step S4, it is judged whether or not the absolute value of the detected yaw rate is a value in a range from 10 deg/sec (third vehicle behavior amount predetermined value) to 2 deg/sec (second vehicle behavior amount predetermined value) for 500 msec (second predetermined time), within 1 second (first predetermined time) of the judgment counter. In other words, it is judged whether or not the detected yaw rate satisfies a "predetermined condition of a vehicle behavior," or more particularly, whether or not a time, in which the absolute value of a vehicle behavior (yaw rate) is in a range from the second vehicle behavior amount predetermined value to the third vehicle behavior amount predetermined value, is the second predetermined time or longer. That is, in this case, it is judged whether or not the vehicle C pulls to one side. In particular, although a relatively large steering torque is detected in step S2, thereafter, if a not-so-large yaw rate in a range from 10 to 2 deg/sec (predetermined condition) is detected for at least 500 msec (YES in S4), the state is judged as one-side pull.

In contrast, if the yaw rate is equal to or smaller than 2 deg/sec (second vehicle behavior amount predetermined value) (NO in S4), it is judged that the vehicle travels straight ahead and does not pull to one side. Also, if a yaw rate of 10 deg/sec (three vehicle behavior amount predetermined value) or larger is detected, the state is judged as a turn.

That is, if the value of the yaw rate while the judgment counter is activated satisfies the condition in step S4 (YES in S4), the vehicle C is judged as pulling to one side, and hence the processing goes to step S5. In contrast, if the value of the yaw rate does not satisfy the condition in step S4 (NO in S4), the vehicle C is in a turn (third vehicle behavior amount predetermined value or larger) or travels straight ahead (second vehicle behavior amount predetermined value or smaller). The one-side pull response control does not have to be executed, and the processing returns to step S1 (or the processing may go out of this routine).

In next step S5, it is judged whether or not the absolute value of the steering torque is smaller than 10 Nm (second steering torque predetermined value). If the value is smaller (YES in S5), it may be considered that the vehicle C travels on a cant road in the driving style of the instant steering. To execute the one-side pull response control, the processing goes to step S6.

In contrast, if the value is equivalent or larger (NO in S5), it may be considered that the instant steering is less possibly made (steering is held). The processing returns to step S1 (or the processing may go out of this routine).

In step S6, the one-side pull response steering angle value is set from the initial value (for example, 0 deg) to a predetermined value, and outputs the predetermined value to the subtracter 121.

In this way, the one-side pull can be judged through one cycle of this flowchart without repetition of steps S1 to S5. It is to be noted that the predetermined values provided herein and the above-described respective predetermined values are properly set through experiments or simulations. The initial value is also properly set similarly.

As the result, the current value setting unit 122 sets the current value based on the shifted midpoint. The current value, which is set by (output from) the current value setting unit 122, is the current value (base current value) serving as the base for the target current value (one-side pull response). As described above, the map of the steering angle and the current value (base current value) in the current value setting unit 122 (that is, information of correspondence between the steering angle and the current value) is configured to provide the center feel.

Also, in this embodiment, the multiplier 125 multiplies the base current value, which is output from the current value setting unit 122 and processed by the low-pass filter 123, by the first ratio output from the first ratio output unit 124. The first ratio is set to be smaller as the steering torque is larger. This is because the target current value (one-side pull response) is decreased so that the target current value (one-side pull response) output from the one-side pull response controller 12 does not disturb travel when the vehicle turns right or left, changes the lane, or makes an obstacle avoidance behavior.

Also, the adder 129 adds the damper current value output from the damper current value setting unit 126 to the base current value multiplied by the first ratio. The damper current value is set so that the absolute value of the damper current value becomes the minimum when the motor rotation speed is zero. Then the multiplier 128 multiplies the damper current value by the second ratio output from the second ratio output unit. The multiplied damper current value is set at a large value for quick steering and is set at a small value for strong steering (right or left turn, lane change, obstacle avoidance behavior, etc.). Then, the adder 129 adds the damper current value to the base current value.

As described above, the one-side pull response controller 12 executes control to supply the motor 3 with current, which prevents the motor 3 from being rotated by an external force caused by a cant road or side winds (further, steering with an unintentional small force of the driver), in other words, current which prevents the position of the steering wheel H held by the driver from being shifted by the external force.

The base current value, which is multiplied by the first ratio by the multiplier 125 and which is added with the damper current value by the adder 129, is output from the one-side pull response controller 12 as the target current value (one-side pull response). The output target current value (one-side pull response) is selected by the switch 14, passes through the limiter 15, and is added at the adder 16, because the cruise control switch SW is ON.

With the one-side pull response control, in the vehicle C, according to this embodiment, even on a cant road or in side winds, a displacement from the angle (steering angle) of the steering wheel H determined by the driver is restricted by the force of the motor 3, and the load of the driver is markedly decreased to the level of a flat road.

Also, when the one-side pull response control is started, the steering torque during straight-ahead travel of the vehicle C is decreased, the instant steering is no longer required. Even if the vehicle C is driven with the instant steering, the interval between the instant steering and the next instant steering is elongated, and the load of the driver is decreased accordingly.

Since the midpoint is shifted by the one-side pull response steering angle value, in this embodiment, the driver feels that the center of the steering wheel H is slightly shifted to the right as compared with the center.

The one-side pull response control is disabled if the driver operates the cruise control switch SW, or if the cruise control switch SW is turned OFF by an operation of the accelerator pedal by the driver.

If the driver operates the steering wheel H for a turn or lane change during the one-side pull response control, for example, the midpoint shift controller 120 monitors (1) whether the yaw rate exceeds a predetermined threshold or (2) whether the motor rotation speed (steering angle speed) exceeds a predetermined threshold, and if any of the values exceeds the corresponding threshold, the cancel condition for the one-side pull response control is considered to be established and the one-side pull response steering angle value is set at the initial value (for example, 0 deg). That is, the midpoint of the steering angle is returned to the original position. Hence, even if the cruise control switch SW is turned ON and the target current value (one-side pull response) of the one-side pull response controller 12 is added to the target current value of the EPS controller 11, the return of the steering wheel H by the self-alignment torque is not significantly disturbed.

[Flowchart for Cruise Control Association]

Figure 6:
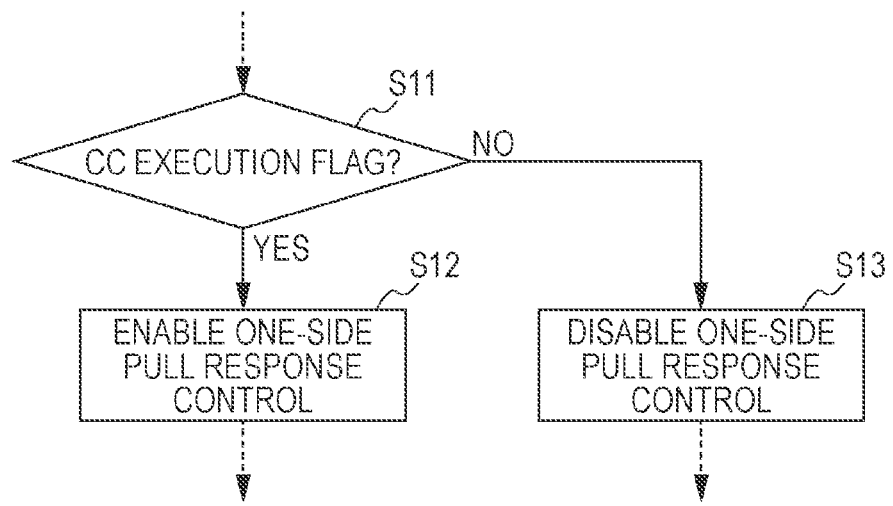
FIG. 6 is a brief flowchart showing association between the cruise control and the one-side pull response control according to this embodiment.

FIG. 6 is a brief flowchart showing association between the cruise control and the one-side pull response control according to this embodiment.

In the flowchart in FIG. 6, it is judged whether or not the EPS_ECU 1 is in the cruise control, that is, whether or not the cruise controller 21 outputs a CC execution flag (step S11). If the driver turns ON the cruise control switch SW, the state is under the cruise control (YES in step S11), and the EPS_ECU 1 turns ON the one-side pull response control (step S12). That is, the switch 14 of the EPS_ECU 1 is switched to select the target current value (one-side pull response) output from the one-side pull response controller 12. Accordingly, the one-side pull response control is enabled (ON).

In contrast, if the driver turns OFF the cruise control switch SW or the cruise control switch SW is turned OFF because the accelerator etc. is operated (NO in step S11), the cruise controller 21 does not output the CC execution flag. The switch 14 is switched to select the zero current value output from the zero current value output unit 13. Accordingly, the one-side pull response control is disabled (OFF) (step S13).

In this embodiment, even if the CC execution flag is not output, as shown in FIGS. 2 and 3, the respective units of the one-side pull response controller 12 function. Hence, in step S13, indications such as "system ON" and "system inactive" of the one-side pull response control may be displayed on an instrument panel etc. Also, in step S12, indications such as "system ON" and "system active" of the one-side pull response control may be displayed on the instrument panel etc.

Conclusion of First Embodiment

With the above-described first embodiment, proper drive assist suitable for the driving style of the instant steering is provided in association with the cruise control even when an external force that causes one-side pull to be generated at the vehicle C is generated, for example, by a cant road or side winds, that is, the assist which has not been properly provided by EPS of related art may be provided. Hence, the load of the driver can be markedly decreased.

In this embodiment, the one-side pull response control is associated with the cruise control switch SW, and if the cruise control switch SW is turned ON, the switch 14 is switched to the one-side pull response controller 12 and the one-side pull response control is enabled. Alternatively, a switch that enables the one-side pull response control may be provided, and if this switch is turned ON, the switch 14 may be switched to the one-side pull response controller 12.

However, a situation in which the one-side pull response control is used is similar to a situation in which the cruise control is used. Hence, in the first embodiment, a switch for enabling the one-side pull response control is not independently provided, and is shared by the cruise control switch SW. Accordingly, the number of parts is decreased, and the operation of the driver is simplified.

In the flowchart in FIG. 5, the one-side pull response control is started if step S5 is YES after the processing runs through step S1 to step S5 by one cycle. That is, one-side pull can be judged quickly through only the one cycle. Alternatively, for example, if step S4 is YES (or if step S5 is YES), the processing may return to step S1 again to cause the processing runs for the second cycle. If step S4 is YES or if step S5 is YES in the second cycle, the midpoint may be shifted to start the one-side pull response control. That is, by performing the two cycles or more, travel on a cant road can be further reliably recognized, and proper one-side pull response control can be executed.

Also, in this embodiment, if the cruise control switch SW is not ON, the switch 14 is switched to the zero current value output unit 13. Accordingly, even if step S5 is YES, as long as the cruise control switch SW is OFF, the target current value (one-side pull response) serving as the correction current value output from the one-side pull response controller 12 is not reflected on the drive of the motor 3 (being disabled).

Alternatively, the switch 14 may be omitted, or the switch 14 may be switched to the one-side pull response controller 12 if step S5 is YES.

Also, the judgment on the driving style of the instant steering is not limited to the flowchart in FIG. 5. Whether the driving style is the instant steering or not may be judged by judging whether or not pulse-like steering is detected a plurality of times in the same direction and at a predetermined interval with reference to the detection value of the steering torque sensor 42 and/or the detection value of the steering angle sensor 41.

Second Embodiment

Next, a second embodiment of the present disclosure is described.

Figure 7:
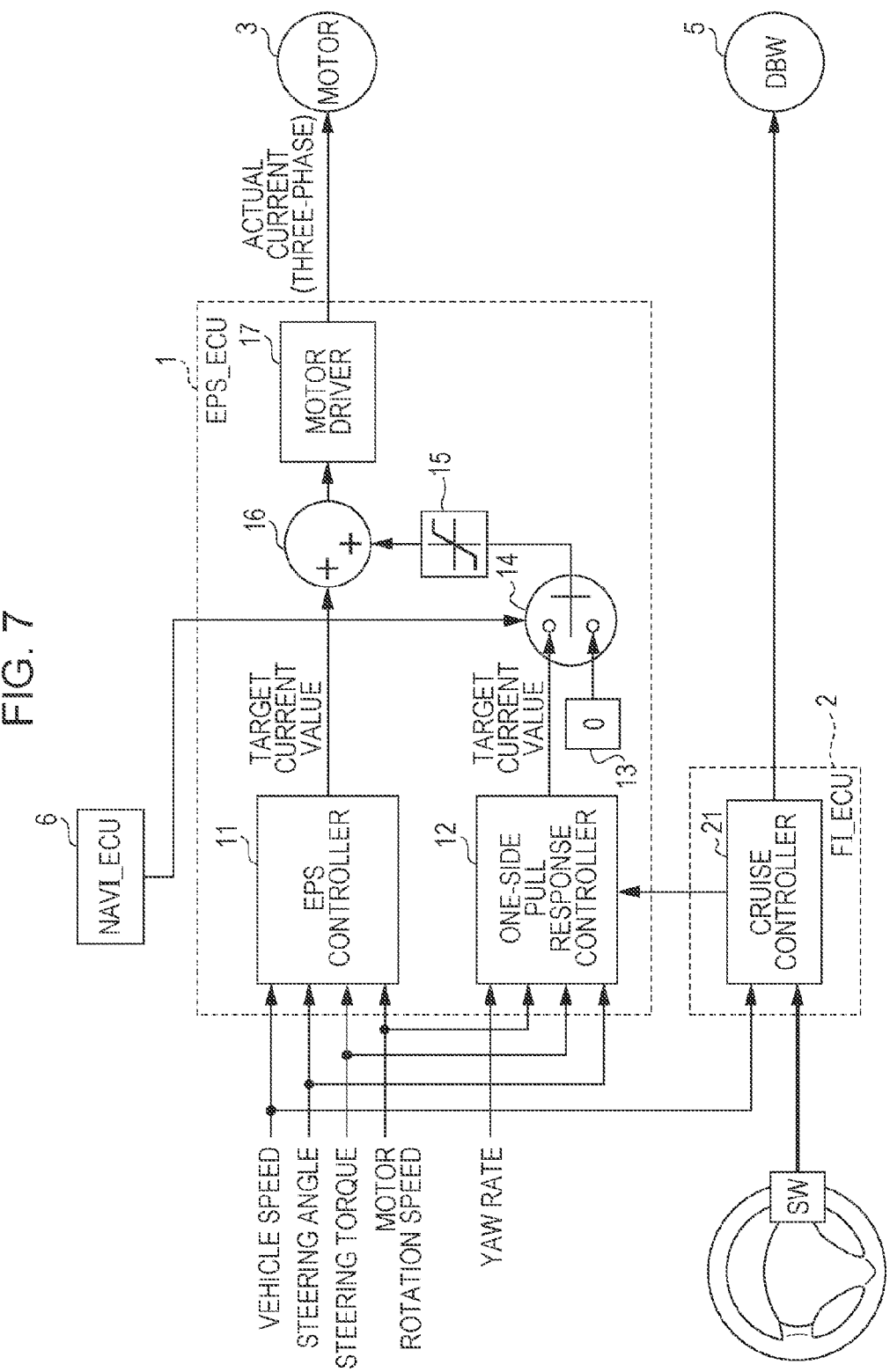
FIG. 7 is a block diagram showing association according to a second embodiment.

FIG. 7 is an illustration showing association according to the second embodiment.

Regarding the association between the cruise controller 21 in the FI_ECU 2 and the EPS_ECU 1 according to the above-described first embodiment (see FIG. 2 etc.), based on an assumption that, when the cruise control switch SW is ON, the one-side pull response control is more likely executed, and when the cruise control switch SW is ON, large steering is less made and the one-side pull response control less likely disturbs comfortableness of the driver; the switch 14 is switched to the one-side pull response controller 12 and the one-side pull response control is enabled in response to the ON state of the cruise control switch SW as a trigger.

In the second embodiment, such association like the first embodiment is not provided; however, association with an ECU of a navigation system (NAVI_ECU 6) is provided. With this association, if the NAVI_ECU 6 judges that the vehicle C is on a straight road, the NAVI_ECU 6 outputs a signal (flag) indicative of the judgment, to switch the switch 14 to the one-side pull response controller 12; and if the NAVI_ECU 6 judges that the vehicle C is not on a straight road, outputs a signal (flag) indicative of the judgment, to switch the switch 14 to the zero current value output unit 13. The reason is similar to the association with the cruise controller 21 in the first embodiment, and hence the description is omitted.

Also, since the navigation system is a known technology, the description of the NAVI_ECU 6 is also omitted.

In the second embodiment, the cruise controller 21 in the FI_ECU 2 is associated with the EPS_ECU 1 in a meaning different from the first embodiment. Hereinafter, different association with the cruise controller 21 in the second embodiment is described.

A situation, in which the cruise control switch SW is turned ON by the driver, may be equivalent to a situation, in which the driver's intention for steering is weak. Hence, the force of gripping the steering wheel H may be possibly weakened. In the second embodiment, in association with the cruise controller 21, if the one-side pull response controller 12 detects that the cruise controller 21 outputs the CC execution flag (described in the first embodiment), the one-side pull response controller 12 increases the control amount of the one-side pull response control (target current value (one-side pull response)) (the method of increasing the control amount may be reversal to a method of a third embodiment, described later).

Accordingly, even if the cruise control switch SW is turned ON by the driver during the one-side pull response control, and even if the driver weakens the force of gripping the steering wheel H, the steering can be held properly.

The switch with reference sign of SW in FIG. 7 is described as the cruise control switch. However, the switch with reference sign of SW may not be the cruise control switch, and may be replaced with a hand-release detection sensor that detects whether or not the driver grips the steering wheel H or not (hand is released or not). The one-side pull response controller 12 may use the signal of the hand-release detection sensor SW, and if the hand is released, the control amount of the one-side pull response control may be increased (that is, the reference sign SW in this case denotes the hand-release detection sensor). In the above description, the reference sign SW denotes the cruise control switch or the hand-release detection sensor. However, these members may not be alternatively provided, and both may be provided. Alternatively, the hand-release state may be detected by a sensor that measures the gripping force.

In the second embodiment, proper one-side pull response control can be executed when the steering hold force of the driver is weakened.

Third Embodiment

In the above-described second embodiment, the control amount of the one-side pull response control is increased when the gripping force of the driver for the steering wheel H is weakened. In contrast, in a third embodiment, the control amount of the one-side pull response control (target current value (one-side pull response)=correction current value) is decreased or the one-side pull response control is stopped.

Figure 8:
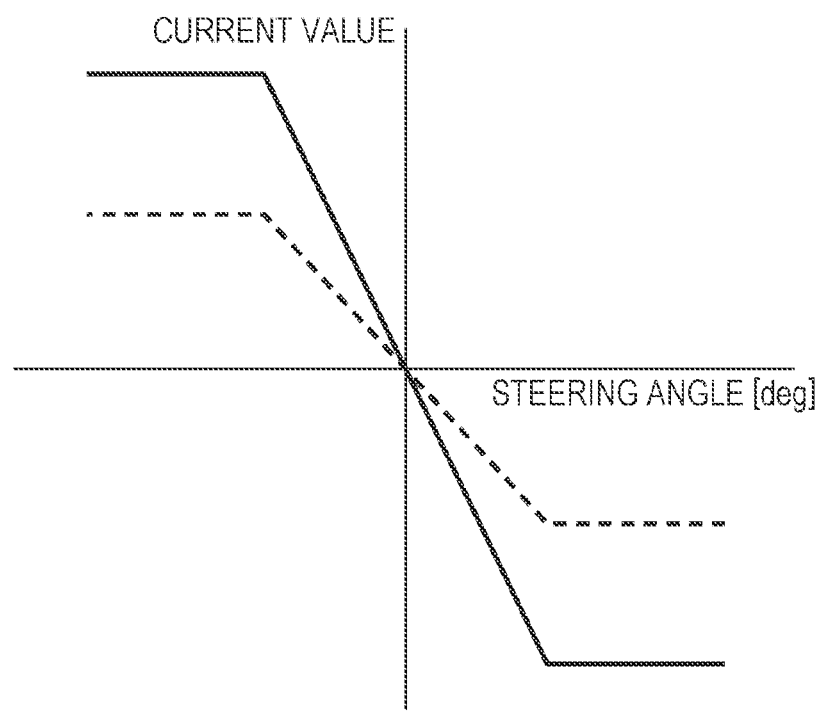
FIG. 8 illustrates an example in which a control amount of one-side pull response control is decreased by adjusting information of correspondence between a steering angle and an electric current value in a current value setting unit in FIG. 3, as an example of a third embodiment.

FIG. 8 illustrates an example in which a control amount of one-side pull response control is decreased by adjusting information of correspondence between the steering angle and the current value in the current value setting unit 122 in FIG. 3, as an example of the third embodiment.

[At Very Low Vehicle Speed Etc.]

The effect of a cant road is relatively hardly received at a very low vehicle speed or when the vehicle stops. Hence, when the vehicle speed based on the wheel speed sensor 44 is as low as, for example, 10 km/h or lower, or when the vehicle stops at zero vehicle speed, the control amount of the one-side pull response control (target current value (one-side pull response)) is decreased or the one-side pull response control is stopped.

A decreasing method may be that (1) the current value (absolute value) corresponding to the steering angle in information (map) of correspondence between the steering angle and the current value (base current value) in the current value setting unit 122 (see FIG. 3) is decreased from a solid line to a broken line as shown in FIG. 8. Also, (2) the one-side pull response controller 12 (see FIG. 3) shifts the one-side pull response steering angle value as another decreasing method. The control amount of the one-side pull response control may be decreased by any of various methods, for example, by decreasing the shift amount.

Also, the one-side pull response control can be stopped, for example, by switching the switch 14 to the zero current value output unit 13.

[At Night]

Also, at night, since visibility is poor (recognizable forward distance is decreased), the straight-ahead travel judgment by visual check of the driver may become not reliable. Owing to this, although the driver can align the steering wheel H with the steering angle corresponding to the cant road in daylight, the accuracy of alignment is decreased at night. Consequently, the driving may be performed in a meandering manner. If the midpoint of the steering angle is shifted by the one-side pull response control and the driving is performed in a meandering manner, one of directions of the meandering driving may be a direction opposite to the direction of the steering of the driver. Thus, the meandering driving may disturb the steering of the driver. Hence, at night, the one-side pull response control amount is decreased or the one-side pull response control is stopped by any of the above-described methods. Accordingly, the uncomfortable feel can be restricted.

The control amount can be decreased or the control is stopped through association with a switch of a headlight or association with a watch included in the vehicle.

[Blinker Operation]

Also, when a blinker is operated, the control amount of the one-side pull response control is decreased or the one-side pull response control is stopped in association with the winker.

Also, when anti brake lock system (ABS) or vehicle stability assist (VSA, registered trademark) is activated, or when an obstacle avoidance assist device (rear-end collision avoidance device) is activated, the control amount of the one-side pull response control is decreased or the one-side pull response control is stopped in association with any of ABS and VSA. In this case, in the obstacle avoidance device or the like, the control amount of the one-side pull response control may be variable in accordance with a time to collision (TTC). For example, the control amount (target current value (one-side pull response)) is set at a smaller value if TTC is 2 seconds, as compared with the control amount if TTC is 5 seconds.

[Others]

The present disclosure described in the first to third embodiments may be implemented without being limited to the above-described embodiments. For example, the switch 14 may be switched to the zero current value output unit 13 if a navigation system recognizes that the vehicle C travels on a curve road or a town street.

Also, the switch 14 or the zero current value output unit 13 is not an essential configuration, and may be omitted.

The present disclosure can handle a curved cant road (side winds).

Also, the present disclosure may be applied not only to the vehicle C including the engine, but also to any kind of vehicles, such as an electric vehicle or a fuel-cell electric vehicle. In the case of the electric vehicle or fuel-cell electric vehicle, the cruise control controls drive of an inverter for a drive motor, to provide travel at a constant vehicle speed. Also, the cruise control may be applied to adoptive cruise control (ACC) that keeps a predetermined distance between vehicles by automatically operating a brake in addition to an accelerator.

Also, the present disclosure may be applied to stair by wire.

Further, the present disclosure may be applied to a situation in which a body of a vessel (ship, boat) pulls in the lateral direction because of tide or side winds (in a situation that one-side pull is generated), when a driver holds steering of a steering handle of the vessel. That is, the present disclosure may be applied by replacing the wording vehicle in the claims with a vessel or other configuration of transportation. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle steering device comprising:
a steering torque detection unit that detects a steering torque, and a vehicle yaw rate detector that detects a vehicle yaw rate, the vehicle steering device controlling an electric current value applied to an electric motor to apply an assist torque to a steering system based on the steering torque;
a one-side pull controller that detects one-side pull of a vehicle, and calculates a correction current value, which corrects the current value to restrict the one-side pull,
wherein the one-side pull controller:
determines whether the vehicle is in a first vehicle state based on the detected steering torque and the detected vehicle yaw rate, and if so,
determines whether an absolute value of the steering torque becomes a first steering torque predetermined value or larger in the first vehicle state, and if so,
determines whether the vehicle yaw rate satisfies a predetermined condition within a first predetermined time period since the absolute value of the steering torque becomes the first steering torque predetermined value or larger in the first vehicle state, and if so,
determines that the vehicle is in the one-side pull state and calculates the correction current value in the same steering torque direction as a direction of the steering torque when the first steering torque predetermined value is satisfied, and
wherein the one-side pull controller:
detects the one-side pull of the vehicle by using the steering torque and the vehicle yaw rate, pre-stores a relationship between a one-side pull response steering angle value and the correction current value, and moves a midpoint in the one-side pull response steering angle value in accordance with an integrated value of the steering torque to decide the correction current value so as to restrict the one-side pull.

2. The vehicle steering device according to claim 1, wherein the first vehicle state satisfies that the absolute value of the steering torque is smaller than a second steering torque predetermined value, which is smaller than the first steering torque predetermined value, and that an absolute value of the vehicle yaw rate is smaller than a first vehicle yaw rate amount predetermined value.

3. The vehicle steering device according to claim 1, wherein the predetermined condition of the vehicle yaw rate is that a length of time, in which an absolute value of the vehicle yaw rate is in a range from a second vehicle yaw rate-amount predetermined value to a third vehicle yaw rate amount predetermined value, is a second predetermined time period or longer.

4. The vehicle steering device according to claim 1, wherein the steering torque detection unit is a steering torque sensor, and the vehicle yaw rate detector is a yaw rate sensor.

5. The vehicle steering device according to claim 2, wherein the steering torque detection unit is a steering torque sensor, and the vehicle yaw rate detector is a yaw rate sensor.

6. The vehicle steering device according to claim 3, wherein the steering torque detection unit is a steering torque sensor, and the vehicle yaw rate detector is a yaw rate sensor.

7. A method of controlling a vehicle steering device including a steering torque sensor that detects a steering torque, and a yaw rate sensor that detects a vehicle yaw rate, the vehicle steering device controlling an electric current value applied to an electric motor to apply an assist torque to a steering system based on the steering torque, the method comprising:

determining whether the vehicle is in a first vehicle state based on the detected steering torque and the detected vehicle yaw rate, and if so, determining whether an absolute value of the steering torque becomes a first steering torque predetermined value or larger in the first vehicle state, and if so, determining whether the vehicle yaw rate satisfies a predetermined condition within a first predetermined time period since the absolute value of the steering torque becomes the first steering torque predetermined value or larger in the first vehicle state, and if so, determining that a vehicle is in one-side pull state and calculating a correction current value, which corrects the current value to restrict the one-side pull, in the same steering torque direction as a direction of the steering torque when the first steering torque predetermined value is satisfied, and applying the corrected current value to the electric motor to apply the assist torque to the steering system, wherein the step of determining that the vehicle is in one-side pull state includes:

detecting the one-side pull of the vehicle by using the steering torque and the vehicle yaw rate, pre-storing a relationship between a one-side pull response steering angle value and the correction current value, and moving a midpoint in the one-side pull response steering angle value in accordance with an integrated value of the steering torque to decide the correction current value so as to restrict the one-side pull.

* * * * *